United States Patent
Diep et al.

(10) Patent No.: US 10,037,433 B2
(45) Date of Patent: Jul. 31, 2018

(54) SECURE TEXT RETRIEVAL

(71) Applicant: NTT DOCOMO Inc., Tokyo (JP)

(72) Inventors: Trung Diep, Palo Alto, CA (US); Pero Subasic, Los Altos, CA (US)

(73) Assignee: NTT DOCOMO INC., Tokyo (JP)

( * ) Notice: Subject to any disclaimer, the term of this patent is extended or adjusted under 35 U.S.C. 154(b) by 177 days.

(21) Appl. No.: 14/932,684

(22) Filed: Nov. 4, 2015

(65) Prior Publication Data

US 2016/0292451 A1    Oct. 6, 2016

Related U.S. Application Data

(60) Provisional application No. 62/142,994, filed on Apr. 3, 2015.

(51) Int. Cl.
*H04L 29/06* (2006.01)
*G06F 21/62* (2013.01)

(52) U.S. Cl.
CPC .. *G06F 21/6227* (2013.01); *G06F 2221/2107* (2013.01); *G06F 2221/2115* (2013.01)

(58) Field of Classification Search
CPC .................................. H04L 9/00; G06F 21/00
See application file for complete search history.

(56) References Cited

U.S. PATENT DOCUMENTS

| | | | |
|---|---|---|---|
| 8,533,489 B2 | 9/2013 | Roeder et al. | |
| 9,405,928 B2 * | 8/2016 | Amarendran | G06F 21/6218 |
| 2009/0022309 A1 * | 1/2009 | Vanstone | G06F 17/2264 |
| | | | 380/28 |

(Continued)

FOREIGN PATENT DOCUMENTS

| JP | 2001-331519 | 11/2001 |
|---|---|---|
| JP | 2005-202520 | 7/2005 |

(Continued)

OTHER PUBLICATIONS

Cong Wang et al., "Secure Ranked Keyword Search Over Encrypted Cloud Data", Distributed Computing Systems (ICDCS), 2010 IEEE 30th International Conference on Distributed Computing Systems, IEEE, Piscataway, NJ, USA. Jun. 21, 2010. pp. 253-262, 10 pages, whole document.

(Continued)

*Primary Examiner* — Joseph P Hirl
*Assistant Examiner* — Leynna Truvan
(74) *Attorney, Agent, or Firm* — Haynes and Boone, LLP (57) ABSTRACT

Methods and systems described herein may perform a word-level encryption and a sentence-level encryption of one or more documents. The word-level encryption and the sentence-level encryption may be performed with an encryption key generated by a client device. A document indexer is stored in the one or more storage networks. The document indexer includes encrypted word frequencies and encrypted word position identifiers based on the encrypted words of the one or more encrypted documents. The client device receives search terms and encrypts the search terms with the encryption key. The one or more encrypted documents are identified in the one or more storage networks based on searching with the encrypted search terms and at least one of the encrypted word frequencies and/or the encrypted word position identifiers.

20 Claims, 6 Drawing Sheets

(56) References Cited

U.S. PATENT DOCUMENTS

| | | |
|---|---|---|
| 2010/0146299 A1 | 6/2010 | Swaminathan et al. |
| 2013/0238646 A1 | 9/2013 | Maro |
| 2014/0052999 A1 | 2/2014 | Aissi et al. |
| 2014/0359282 A1 | 12/2014 | Shifka et al. |
| 2015/0193486 A1 | 7/2015 | Moataz et al. |

FOREIGN PATENT DOCUMENTS

| | | |
|---|---|---|
| JP | 2011-022922 | 2/2011 |
| JP | 2013-152520 | 8/2013 |
| WO | WO 2014/135493 A1 | 9/2014 |

OTHER PUBLICATIONS

Extended European Search Report in European Patent Application No. 16154434.1-1870, dated Aug. 2, 2016, 9 pages.

Notice of Reasons for Rejection, Japanese Office Action, dated Jun. 20, 2017 for corresponding Japanese Application No. P2016-010739, filed Jan. 22, 2016 (6 pages).

Cash et al., "Dynamic Searchable Encryption in Very-Large Databases: Data Structures and Implementation," Rutgers University,University of California Irvine, IBM Research, (Oct. 17, 2014) pp. 1-32, https://eprint.iacr.org/2014/853.pdf.

Chase et al., "Structured Encryption and Controlled Disclosure," Microsoft Research, (2011) pp. 1-18, https://eprint.iacr.org/2011/010.pdf.

Jarecki et al., "Outsourced Symmetric Private Information Retrieval," University of California Irvine, IBM Research, (2013) pp. 1-34, https://eprint.iacr.org/2013/720.pdf.

Kreuter, "Private Information Retrieval Based on Fully Homomorphic Encryption," Computer Science Dept. University of Virginia, (Dec. 10, 2010) pp. 1-9, https://pdfs.semanticscholar.org/0869/981319eaf462ff7ed50c0ad6aff39bfc4d9f.pdf.

Ostrovsky et al., "A Survey of Single-Database PIR: Techniques and Applications", T. Okamoto and X. Wang (Eds.): PKC 2007, LNCS 4450, (2007) pp. 393-411, https://eprint.iacr.org/2007/059.pdf.

* cited by examiner

SECURE TEXT RETRIEVAL

CROSS-REFERENCE TO RELATED APPLICATIONS

This present application claims priority to U.S. Provisional Patent Application No. 62/142,994, entitled, "Secure Text Retrieval," filed on Apr. 3, 2015, the disclosure of which is hereby incorporated by reference in its entirety.

TECHNICAL FIELD

The invention relates to various aspects of data security and more particularly to encrypting documents with an encryption key and searching for the encrypted documents.

BACKGROUND

Protecting contents in a document may involve encrypting one or more words in the document with an encryption key. As such, an authorized person in possession of the encryption key is able to decrypt the encrypted words to read the words in the document. Yet, various types of challenges are encountered with such practices. For example, consider a user that stores an important document with a given provider (e.g., Google Mail). The provider may encrypt the document with a given encryption key and store the encrypted document in the provider's storage networks. The provider may also store the encryption key in the provider's storage networks. Thus, the provider may possess both the encrypted document and the encryption key. As such, the provider generally has access to the contents in the encrypted document and may, in fact, access the contents of the document, possibly unbeknownst to the user. Further, consider a scenario where there is a breach and the breaching party gains access to the provider's storage networks. In such a scenario, the breaching party may gain access to both the encrypted document stored and the encryption key maintained by the provider, thereby risking exposure of the contents in the document. Thus, there are security risks by entrusting the document with the provider.

In addition, various systems may also encounter challenges with balancing the level of security provided by the system and the overall efficiency of the system to search for the documents. For example, consider a scenario where a provider encrypts each word in a document to maintain a higher level of security of the document. As such, if the user searches for the document, the provider may decrypt each word in the document such that the search may be performed. Thus, encrypting each word in the document to protect its contents and decrypting each word in the document simply to search for the document may adversely affect the overall system efficiency, particularly if there is large number of documents that need to be decrypted and searched accordingly.

As such, there is much need for improvements in data security and further balancing the level of security with the overall system efficiency.

SUMMARY

Additional challenges may also be encountered with using encryption to protect the contents of documents. For example, systems may encounter challenges with encryption due to content opaqueness. In particular, encrypted words in a document may become opaque based on various difficulties related to searching for an encrypted document, and more specifically, searching for the encrypted words in the encrypted document. In some instances, possibly based on the type of encryption used, the encrypted words may become wholly unsearchable due to the content opaqueness. Thus, although the security of the encrypted document may be ensured, the encryption may reduce searching efficiencies, possibly due to an unsearchable document.

The following example embodiments are directed to encrypting documents to ensure the security of the documents and enables searches for the encrypted documents while optimizing the system efficiency. For example, a user may utilize a client device to generate an encryption key and perform an encryption of a document that the user wishes to protect. Further, the encryption key is secured locally with the client device and the encrypted document may be sent to a provider to be stored in the provider's storage networks. Notably, the encryption key and the encrypted document are stored in separate locations such that in the event of a breach with the provider's storage networks, the breaching party cannot access both the encrypted document and the encryption key. In particular, the breaching party will not know that the encryption key is secured with the client device. To perform a search for the encrypted document stored in the provider's storage network, the client device is able to generate encrypted search terms using the encryption key secured with the client device. The encrypted document may be identified from the search without decrypting the words in the document. Thus, the searches for the encrypted document may be performed with less steps or operations, thereby optimizing the system's efficiency accordingly.

To encrypt a document, the client device or system may perform an encryption with the words, a combination of words, sentences, paragraphs, sections, pages and/or other word lengths in a document. The encrypted document may be stored in one or more storage networks. The client device may build a document indexer also stored in the one or more storage networks. The document indexer may include encrypted word frequencies of the encrypted document and encrypted word position identifiers of the encrypted document, among other possibilities.

To perform a search for the encrypted document, the client device may receive search terms and encrypt the search terms with the encryption key. As such, the client device may perform a search with the encrypted search words and may identify the encrypted document from the one or more storage networks. The client device may also perform the search utilizing the encrypted word frequencies and the encrypted word position identifiers from the document indexer. As provided, the encryption key may be secured with the client device such that the encryption key is inaccessible by external devices.

The client device may also determine one or more permutations of the encrypted search terms, possibly based on the search terms received by the client device. For example, the one or more permutations may include changes, modifications, and/or variations of the encrypted search terms. As such, the client device may identify the encrypted document based on performing the search with the one or more permutations of the encrypted search terms.

The client device may also perform a second encryption of the first encrypted search words. Further, the client device may send the second encrypted search words to a provider of the one or more storage networks. As such, the encrypted document may be identified based on a decryption of the second encrypted search words to the first encrypted search words. In particular, the first encrypted search words may be used to search and identify the encrypted document.

The document indexer may be stored with a first provider associated with the one or more storage networks. The encrypted document may be stored with a second provider associated with the one or more storage networks. As such, the document indexer and the encrypted document may be stored with different providers. The document indexer may also include a word identifier, a document identifier, and a sentence identifier corresponding to the encrypted document.

The client device may also generate a sub key that is different than the encryption key. For example, the encryption key may be a master key and the sub key may be generated based on the master key. In particular, the master key and the sub key may be different keys. Yet, both the master key and the sub key may be used to encrypt and/or decrypt the same documents. Thus, the encrypted word frequencies and the encrypted word position identifiers in the document indexer may be encrypted with the sub key.

It should be noted that one or more steps of a method and/or operations described herein may be performed by the client device described above. Yet further, a client system including one or more processors may also perform the one or more steps and/or operations. For example, the client system may include a non-transitory computer-readable medium with instructions and the one or more processors may be configured to execute the instructions to perform the steps and/or operations accordingly.

In another example, a server receives one or more encrypted documents from a client device. The one or more encrypted documents may include encrypted words, an encrypted combination of words, encrypted sentences, encrypted paragraphs, and/or other encrypted word lengths of the one or more encrypted documents. The server determines a document indexer in one or more storage networks. The document indexer includes encrypted word frequencies and encrypted word position identifiers based on the encrypted words of the encrypted document. The server receives one or more encrypted search terms from the client device. As such, the server identifies the one or more encrypted documents in the one or more storage networks based on a search performed with the one or more encrypted search terms. The server may identify the one or more encrypted documents further based on the encrypted word frequencies and the encrypted word position identifiers in the document indexer.

The server may include the document indexer and a sub key generated by the client device. The encrypted word frequencies and the encrypted word position identifiers may be encrypted based on the sub key. Further, the document indexer may be stored with a first provider associated with the one or more storage networks. Yet, the encrypted document may be stored with a second provider associated with the one or more storage networks. The document indexer may include a number of word identifiers, a number of document identifiers, and a number of sentence identifiers that correspond to the one or more encrypted documents.

The one or more encrypted search terms may include second encrypted search terms. The server may determine single encrypted search terms based on a decryption of the second encrypted search terms with the sub key generated by the client device. As such, the server may identify the one or more encrypted documents based on the search performed with the single encrypted search terms. The server may determine one or more permutations of the encrypted search terms. As such, the server may identify the one or more encrypted documents based on the search performed with the one or more permutations of the encrypted search terms.

DETAILED DESCRIPTION

Secure text retrieval (STR) involves cryptography and information retrieval. In particular, STR involves using encrypted search terms to search and identify encrypted documents, without having to decrypt the encrypted search terms and/or the encrypted documents. As such, the encrypted documents may be searched and identified in their encrypted form to maintain or increase the security of the documents, without compromising search efficiency. For example, consider a scenario where a provider's system is breached, where the provider stores the encrypted documents. In such a scenario, the encrypted data in the encrypted documents remains secure because the provider does not have the encryption keys that may be used to decrypt the documents. Particularly, the client maintains the encryption keys and secures them locally with the client's devices (e.g., personal devices), thereby keeping the encryption keys inaccessible by external devices.

Figure 1A:
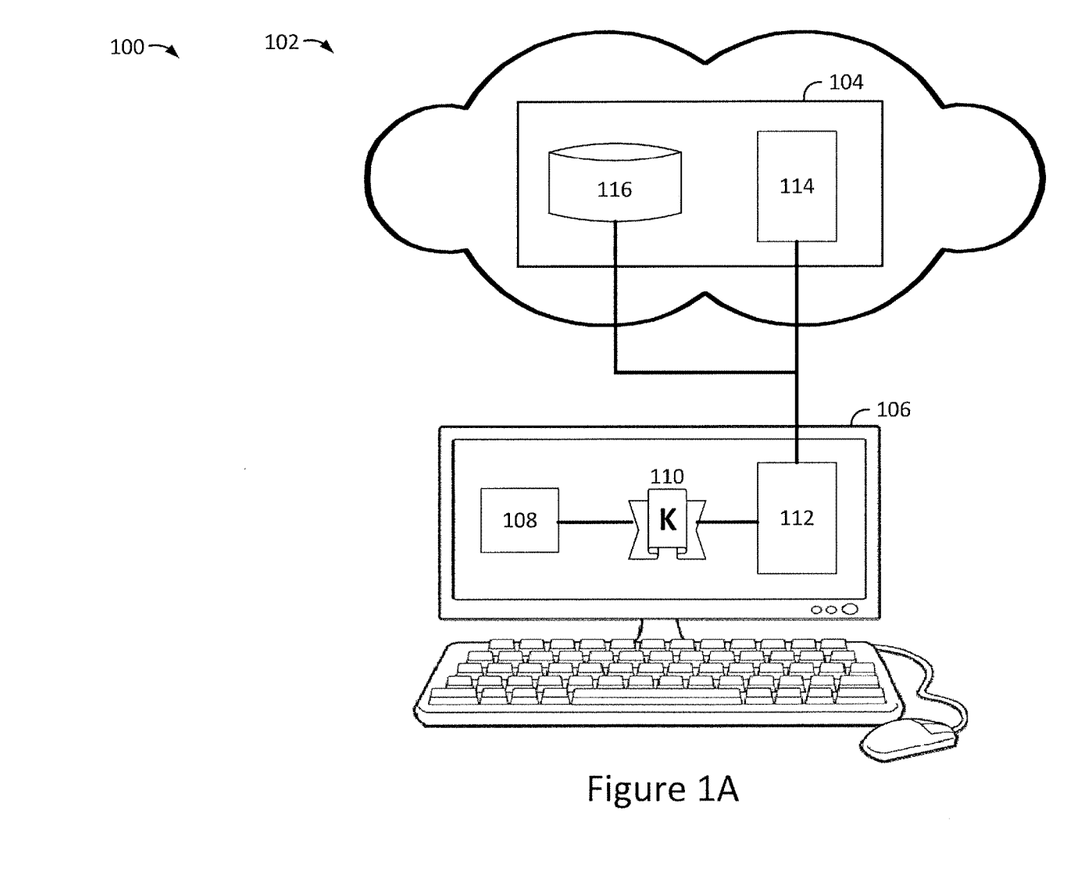
FIG. 1A is an example system including a client device.

Turning now to the drawings, FIG. 1A provides an example system 100 including a client device 106. As shown, the system 100 includes one or more storage networks 102 and a server 104, possibly also referred to as a secured text retrieval (STR) server 104. For example, the one or more storage networks 102 may be provided in an enterprise environment, where the one or more storage networks 102 is a private cloud network. The client device 106 includes an encryption key manager 108 that generates an encryption key 110, shown with the letter "K" for illustrative purposes. Notably, the encryption key 110 is secured with the client device 106 such that the encryption key 110 is inaccessible by other external devices.

The document 112 is encrypted with the encryption key 110 to create the encrypted document 114 and the encrypted document 114 is sent to the server 104. The client device 106 may also build a document indexer 116, possibly also referred to as a secure text retrieval (STR) document indexer 116. The document indexer 116 may facilitate users searching for the encrypted document 114, possibly amongst a large number of other documents stored in the server 104 and/or in other locations of the one or more storage network 102. The client device 106 may also send the document indexer 116 to the server 104. As shown, the server 104 includes the encrypted document 114 and the STR document indexer 116. Yet, it should be noted that the document indexer 116 may be stored in the server 104 and the encrypted document 114 may be stored in a different server remote from the server 104. Notably, storing the encrypted document 114 in a location different from the location of the document indexer 116 may add another level of security for the encrypted document 114.

Figure 1B:
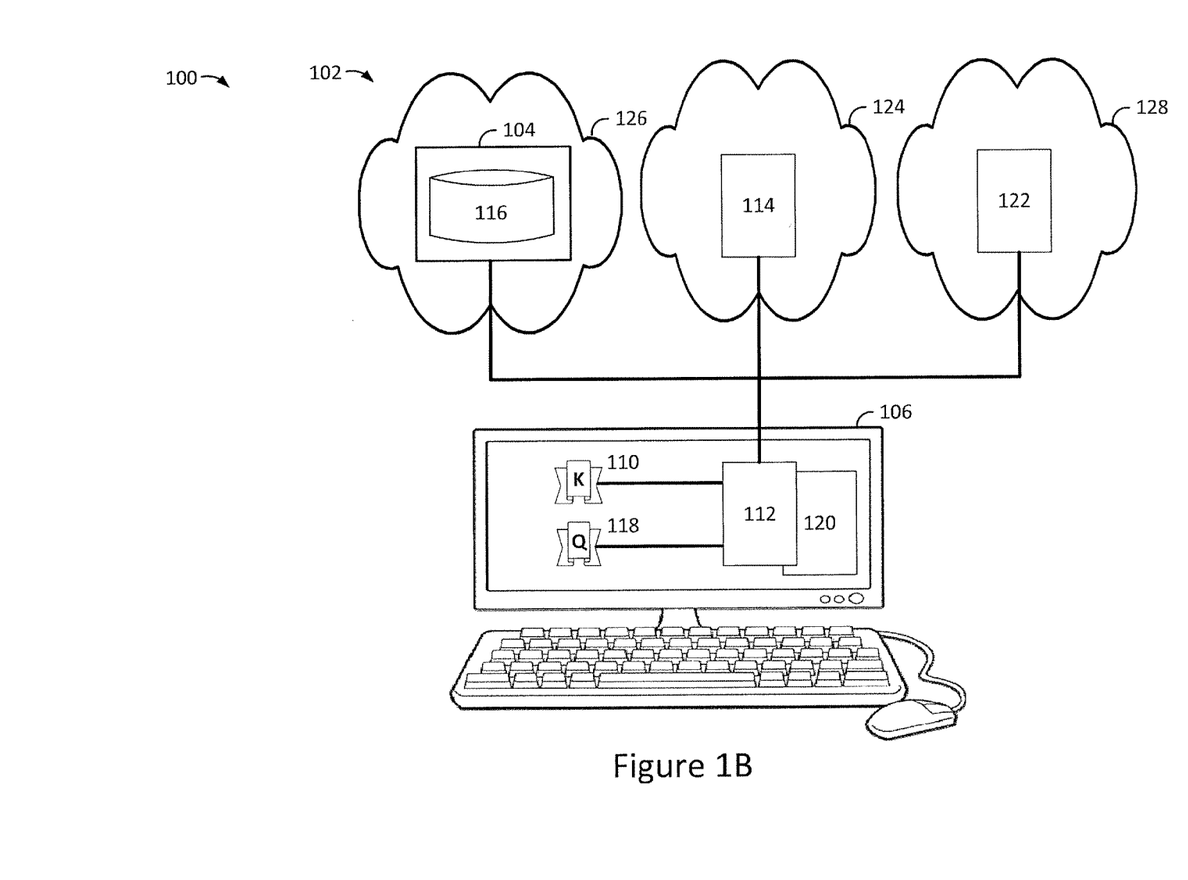
FIG. 1B is an example system including a client device.

FIG. 1B provides an example system 100 including the client device 106. As shown, the system 100 includes the server 104 and the client device 106, as described above in relation to FIG. 1A. The system 100 also includes one or more storage networks 102, where the storage networks 102 include additional storage networks 124, 126, and 128. As illustrated, the client device 106 may generate the encryption key 110 shown with the letter "K," as described above. The encryption key 110 may be used to encrypt the document 112 to create the encrypted document 114 that may be stored in the storage network 124. Further, the encryption key 110 may be used to encrypt the document 120 to create the encrypted document 122 that may be stored in the storage network 128.

Further, the client device 106 may also generate an encryption key 118, shown with the letter "Q" for illustrative purposes. The encryption keys 110 and/or 118 may be generated and stored by the encryption key manager 108 described above. Notably, the encryption key 110 may be a master key and the encryption key 118 may be a sub key of the master key. As such, the user in possession of the master key (e.g., the encryption key 110) may generate the sub keys (e.g., the encryption key 118) and distribute the sub keys to other users authorized to search for the encrypted documents 114 and 122. In another example, the master key may be used to encrypt the documents 112 and 120, and the sub keys may be used to decrypt the documents 114 and 122. Although various users may have different sub keys, each user may be able to use their respective sub key 118 to encrypt the documents 112 and 120, and/or decrypt the documents 114 and 122.

The encryption keys 110 and 118 may be secured with the client device 106 such that the encryption keys 110 and 118 are inaccessible by other external devices. Yet, in some instances, the encryption key 118 may be provided to the server 104, possibly for maintaining the document indexer 116 that is used to search for the one or more encrypted documents 114 and 120. In particular, the document indexer 116 may maintain or organize the encrypted words from the encrypted documents 114 and 122. Notably, having two different encryption keys 110 and 118 may provide additional layers of security. In addition, the server 104 and the encrypted documents 114 and/or 122 may be provided in different data networks to provide additional layers of security. For example, considering the scenarios above, if there is a data breach involving the data network 126 and/or the server 104, the breaching party is unable to intelligibly read contents from the encrypted documents 114 and 122, let alone access the encrypted documents 114 and 122 stored in the other data networks 124 and 128, respectively.

In another example, the encrypted document 114 may be stored with a first provider (e.g., Amazon Web Services) that operates and maintains the storage network 124. The document indexer 116 may be stored with a second provider (e.g., DROPBOX™) that operates and maintains the storage network 126. Notably, having the encrypted document 114 and the document indexer 116 stored in different storage networks 124 and 126, respectively, may facilitate the security of the documents, possibly in the event of a data breach. Further, the document indexer 116 may be used to search for other encrypted documents (e.g., the encrypted document 122) maintained by multiple different providers (e.g., Evernote) in the storage network 128, thereby facilitating searching efficiency of the overall system 100.

In another example, consider a scenario where there is a data breach with the storage network 124 and the breaching party is able to view the encrypted words of the encrypted document 114. In such a scenario, the encryption key 110 is secured with the client device 106, as noted above. As such, the breaching party is unable to decrypt the words in the document 114 to intelligently read or understand the contents of the document 114. Further, any attempts by the breaching party to retrieve the encryption key 110 from the first provider will be unsuccessful since the encryption key 110 is secured with the client device 106. In some instances, the breaching party may continue searching for the encryption key 110 within the storage network 124, without knowing the encryption key 110 is secured with the client device 106.

It should be noted that in the event of a data breach with the second storage network 126, the breaching party is unable to decipher the contents of the document indexer 116. In particular, the breaching party is unable to intelligently read the data in the document indexer 116, since the data appears as tables of alphanumeric codes, digits, and/or numbers. Specifically, the document indexer 116 includes identifiers (e.g., identification numbers) of words, documents, sentences, and other data entries that would not make any sense to the breaching party. Further, the breaching party is unable to access the encrypted document 114, which is stored in a different storage network 124.

Figure 2:
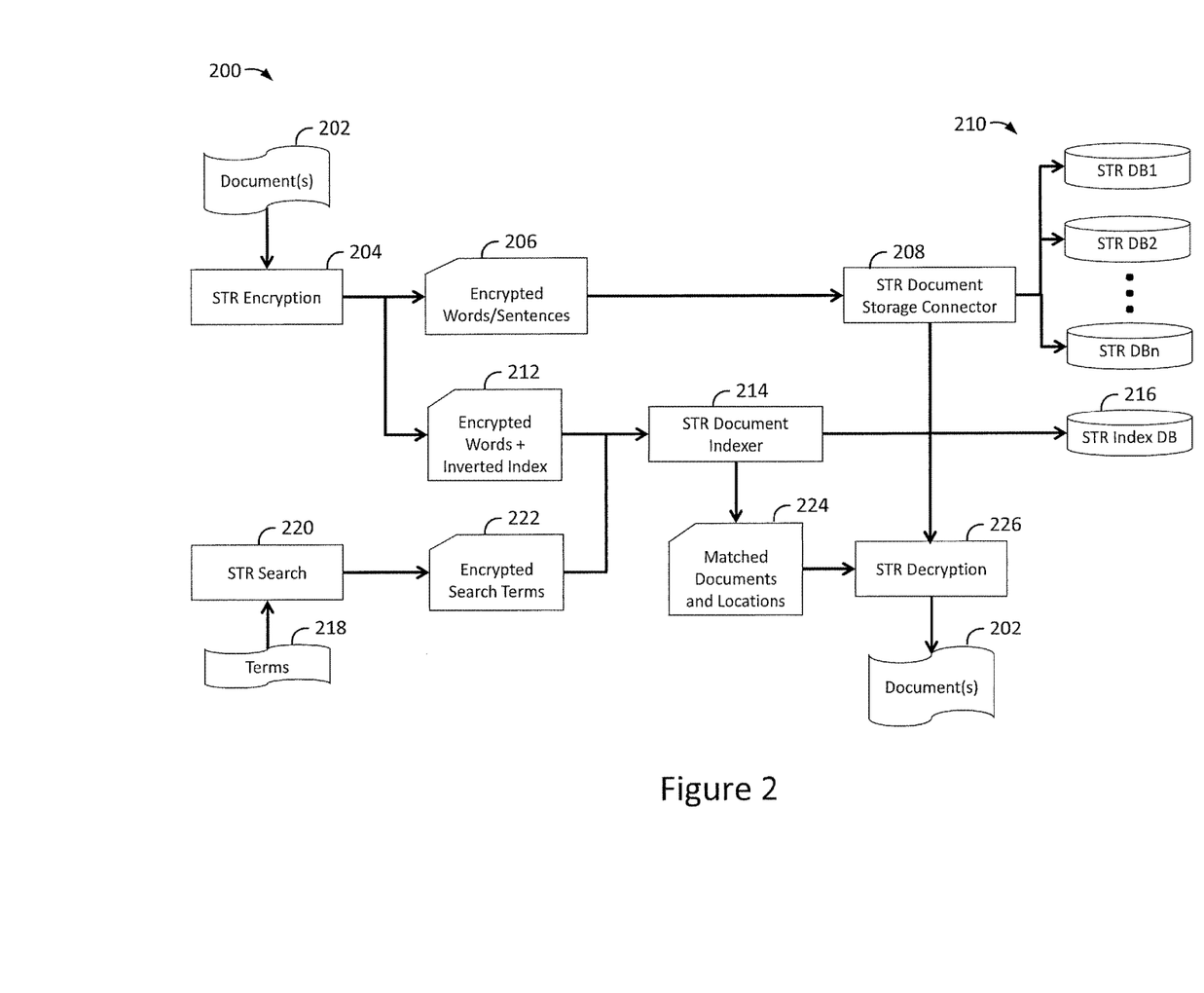
FIG. 2 is an example system including a document indexer.

FIG. 2 is an example system 200 including a document indexer 214. The document indexer 214, possibly also referred to as the STR document indexer 214, may take the form of the document indexer 116 described above in relation to FIGS. 1A-1B. The one or more documents 202 may take the form of the documents 112 and/or 120 described above in relation to FIGS. 1A-1B, such that the one or more documents 202 may be encrypted by the client device 106. As shown, the one or more documents 202 may be encrypted by the STR encryption 204 to produce encrypted words and/or sentences 206.

The one or more documents 202 may be encrypted at different levels. For example, the one or more documents 202 may be encrypted at a word level and at a sentence level to determine the encrypted words and/or sentences 206. The encrypted words and/or sentences 206 may be transferred to the STR document storage connector 208. The STR document storage connector 208 stores the encrypted words and/or sentences 206 in the one or more storage networks 210, particularly the STR databases shown as "STR DB1," "STR DB 2," through "STR DBn," to illustrate multiple databases. The one or more storage networks 210 may take the form of the one or more storage networks 102 (e.g., the storage networks 124-128) described above in relation to FIGS. 1A and 1B.

The STR encryption 204 may produce encrypted words and an inverted index 212. The encrypted words and the inverted index 212 may be transferred to the STR document indexer 214. As such, the STR document indexer 214 may store various identifiers described above (e.g., word identifiers, document identifiers, and sentence identifiers). As shown, the STR document indexer 214 may store this data in the STR index database 216. Notably, the STR index database 216 may be maintained by a given provider (e.g., represented by the data storage network 126) and the STR databases (e.g., STR DB1-DBn) may be maintained by multiple different providers (e.g., represented by the data storage networks 124 and 128). In some instances, based on the sentence-level encryption (e.g., the encrypted sentences 206) and the word-level encryptions 212, additional layers of security may be added to the system 200. For instance, if a search is performed with the STR index database 216 using the encrypted sentences 206, there would be no results because of the STR index database is built on the word-level encryptions 212.

Notably, various other encryptions may be implemented and the embodiments described herein should not be limited to the sentence-level encryptions and/or the word-level encryptions described above. For example, the encryptions described herein may be based on letters, a combination of letters, words, and/or a combination of words, among other possibilities. Further, the encryptions may be based on sentences, paragraphs, sections, pages, and/or various other combinations of such aspects of the documents as contemplated herein. In practice, for instance, documents may be encrypted based on the sentences, paragraphs, and/or other word lengths provided by the documents. In particular, a sentence-level encryption may provide one way of indexing the word to the sentence. Yet, a paragraph-level encryption may provide another way of indexing the word to the paragraph. Yet further, the word-level encryption may be used to encrypt search terms (e.g., keywords), and further perform searches based on the encrypted search terms (e.g., encrypted keywords).

To perform a search, a number of search terms 218 may be received, for example, by the client device 106 described above. The STR search encryption 220 may encrypt the search terms 218 with one or more encryption keys (e.g., encryption keys 110 and/or 118) to create the encrypted search terms 222. The encrypted search terms 222 may be sent to the STR document indexer 214 to determine matched documents and/or locations 224. The STR document storage connector 208 may fetch the encrypted documents (e.g., the one or more documents 202 in encrypted form) from the STR databases, STR DB1-DBn, such that an STR decryption 226 may be performed. Thus, the documents 202 may be retrieved from the search.

Figure 3:
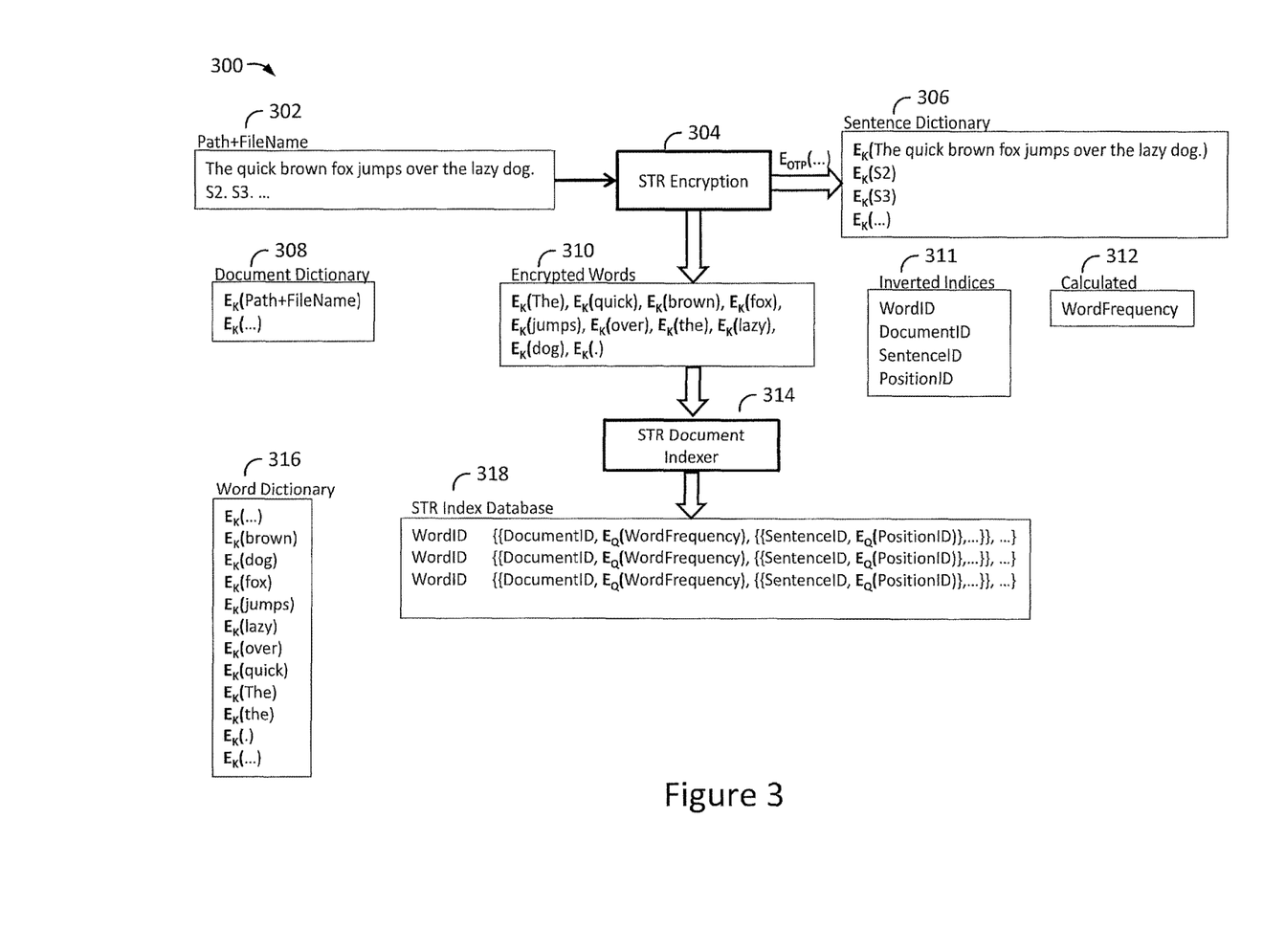
FIG. 3 is an example system including a document indexer.

FIG. 3 is an example system 300 including a document indexer 314. The document indexer 314, possibly also referred to as the STR document indexer 314, may take the form of the STR document indexer 214 described above in relation to FIG. 2. As shown, there may be one or more documents 302, possibly identified by a "path" and a "filename." One sentence in the one or more documents 302, possibly referred to as the sentence "S1," may read, "The quick brown fox jumps over the lazy dog." S1 may be followed by additional sentences represented as "S2" and "S3" in the one or more documents 302. The one or more documents 302 may be encrypted by the STR encryption 304, possibly similar to the STR encryption 204 described above.

The STR encryption 304 may include a sentence-level encryption, possibly using an encryption key (e.g., the encryption key 110) secured with the client device (e.g., the client device 106). As shown, the STR encryption 304 provides a number of encrypted sentences stored in the sentence dictionary 306. One encrypted sentence is shown as "$E_k$(The quick brown fox jumps over the lazy dog)" followed by the additional encrypted sentences "$E_k$(S2)" and "$E_k$(S3)." Notably, the STR encryption 304 may encrypt whole sentences S1, S2, and S3, respectively. Thus, for storing the one or more documents 302 in its encrypted form, the sentence-level encryption may be used to store the encrypted sentences in the sentence dictionary 306. As such, each encrypted sentence in the sentence dictionary 306 may be provided with a sentence identifier (e.g., "SentenceID") shown in the inverted indices 311.

In addition, the STR encryption 304 may include a word-level encryption, possibly also using an encryption key (e.g., the encryption key 110) secured with the client device (e.g., the client device 106). As shown, the STR encryption 304 provides words from the sentence S1 in their encrypted form shown as, "$E_k$(The)," "$E_k$(quick)," "$E_k$(brown)," "$E_k$(fox)," "$E_k$(jumps)," "$E_k$(over)," "$E_k$(the)," "$E_k$(lazy)," "$E_k$(dog)," and "$E_k$(.)." The encrypted words 310 may also include each encrypted word from sentences S2 and S3, accordingly. Thus, the encrypted words 310 is sent to the STR document indexer 314 based on the word-level encryption. As such, each encrypted word from the encrypted words 310 may be provided with a word identifier (e.g., "WordID") shown in the inverted indices 311.

Further, the document dictionary 308 provides the encrypted path and filename shown as "$E_k$(Path+filename)," along with other encrypted paths and filenames of other documents from the one or more documents 302 shown as "$E_k$(. . .)." Thus, each time a new document is created by the client device 106, a document identifier may be assigned for the new document and stored in the document dictionary 308. Further, the inverted indices 311 may provide a document identifier (e.g., "DocumentID") for each document in the document dictionary 308, a word identifier (e.g., "WordID") for each encrypted word of the one or more encrypted words 310, a sentence identifier (e.g., "SentenceID") for each sentence in the sentence dictionary 306, and a position identifier (e.g., "PositionID") that indicates the position of each word in each sentence. In addition, a word frequency calculator 312 may determine the frequency (e.g., "WordFrequency") of each word from the one or more words 310 to facilitate searching.

The STR document indexer 314 generates data for the STR index database 318, which may be similar to the STR index database 216 described above. Yet, each encrypted word from the one or more documents 302 encrypted may have more characters or numbers than the unencrypted word itself. Thus, to save memory storage, the STR index database 318 determines a word identifier (e.g., "WordID") for each of the encrypted words, possibly based on the word identifier determined by the inverter indices 311. As such, the storage space for identifying the encrypted words may be reduced, thereby optimizing search efficiency.

The word dictionary 316 may include each encrypted word. For example, the word dictionary 316 may provide the encrypted words in alphabetical order, "$E_k$(. . .)," "$E_k$(brown)," "$E_k$(dog)," "$E_k$(fox)," "$E_k$(jumps)," "$E_k$(lazy)," "$E_k$(over)," "$E_k$(The)," "$E_k$(the)," "$E_k$(quick)," "$E_k$(.)," and "$E_k$(. . .)." Thus, for each encrypted word, the STR index database 318 includes a word identifier, a document identifier (e.g., "DocumentID"), an encrypted word frequency shown as "$E_O$(WordFrequency)." Further, for each encrypted word, the STR index database 318 includes a number of tuples of sentence identifiers (e.g., "SentenceID") and encrypted position identifiers shown as "$E_O$(PositionID)." The STR encryption 304 may be performed in a single step or all at once, a filter may be applied for each encrypted word, and an encrypted word frequency may be calculated (e.g., by the word frequency calculator 312) such that the STR index database 318 may be ordered by frequency.

Thus, for each occurrence of an encrypted word, the number of the tuples (e.g., the sentence identifier and the encrypted position identifier) may be determined. As such, memory is saved by removing any redundant word identifiers of the same encrypted words. As shown with the brackets, the first set of brackets around the sentence identifier and the encrypted position identifier is the first tuple, followed by a second set of brackets indicating a second tuple, followed by subsequent brackets indicating additional tuples.

As illustrated, "$E_K(word)$" is the designation for an encrypted word, possibly encrypted by a first encryption key (e.g., the encryption key 110) secured with the client device (e.g., the client device 106). Further, "$E_Q(WordFrequency)$" is the encrypted word frequency and "$E_Q(PositionID)$" is the encrypted position identifier, possibly encrypted by a second encryption key (e.g., the encryption key 118). Thus, in the event of a data breach in the STR index database 318, the breaching party cannot decipher any of the words because the word identifier, the document identifier, and the sentence identifier are simply numbers assigned by the inverted indices 311.

Yet, in some circumstances, there may be some possibility that the breaching party may be able to determine words frequently used and the position of the words in the sentences to utilize this information to discover some understanding of the STR index database 318. Thus, to safeguard against such possibilities, the word frequency and the position identifier are encrypted in the STR index database 318, as shown with $E_Q(WordFrequency)$ and $E_Q(PositionID)$. Further, as additional security measures, certain entries in the STR index database 318 may be padded with numbers such that each data entry has the same length, thereby minimizing visibility into the database 318.

In some instances, word identifiers for the same encrypted word may be redundant. For example, the word identifier for a given encrypted word may be 2222. If the encrypted word appears again, the word identifier 2222 may also appear again. As such, in such instances, a second or a "double" encryption may be performed on one or more of the redundant identifiers. In particular, when the client device (e.g., the client device 106) communicates with the server (e.g., the server 104), the client device may encrypt certain words a second time using a one-time password to hide details where the word identifier may be repeated. As such, with the double encryption, even the same encrypted words will have different word identifiers.

In some instances, various cryptographic primitives may be used with the STR encryption 304. For example, the STR encryption 304 may utilize the advance encryption standard (AES) or the Rijndael to encrypt the one or more documents 302. Further, the STR encryption 304 may utilize cipher block chaining (CBC) along with padding the data entries as described above to encrypt the one or more documents 302. Additional levels of security may be implemented with a one-time password (OTP) to prevent breaching parties from tracking the client device's communication lines (e.g., with an oscilloscope) to monitor data that is transferred between the client device and the server. The OTP would eliminate possibilities of a data breach under such circumstances.

To perform a search with the STR document indexer 300, the search terms are encrypted with the encryption key (e.g., the encryption key 110) secured with the client device (e.g., the client device 106). As such, each of the search terms are encrypted with the encryption key, without breaking the search terms into partial terms. In some instances, various permutations of the words may also be encrypted and searched. For example, the search term, "Walt," by itself may be uninteresting. Further, the search term, "Disney," may have various connotations to children's stories, books, multimedia, and theme parks. Yet, the two words together, "Walt Disney," refers to a famous entrepreneur, cartoonist, animator, voice actor, and film producer. As such, by utilizing regular expression searching, various permutations of "Walt" and "Disney" may be searched to produce the desirable result.

In another example, consider a separate set of search terms, "Bill Clinton," received by the client device to perform a search. The STR document indexer 314 and the STR index database 318 enables the system 300 to perform searches with the terms "William Jefferson Clinton" to identify the encrypted document desired. Note, that conventional searching mechanisms, such as Boolean searching, would not have identified the document because the search terms, "Bill Clinton," only have two words. Yet, the words that may be identified in the document searched are three words, "William Jefferson Clinton." As such, the searching capabilities with the STR document indexer 314 and the STR index database 318 enables the system 300 to perform searches with numerous permutations and possibilities beyond that of conventional systems.

In particular, a search may involve generating a list of possible permutations of the encrypted search terms and identifying matches with the STR index database 318. In particular, every word of the one or more document 302 may be encrypted to optimize the search capabilities beyond those of conventional systems that may only encrypt subsets of words. As such, searching with the STR document indexer 314 and the STR index database 318 enables the system 300 to perform searches with numerous permutations (e.g., singular form, plural form, and different spellings). Notably, a search engine that may be configured to search for non-encrypted terms may seamlessly convert to the STR encryption and the STR-based searching described herein.

Figure 4:
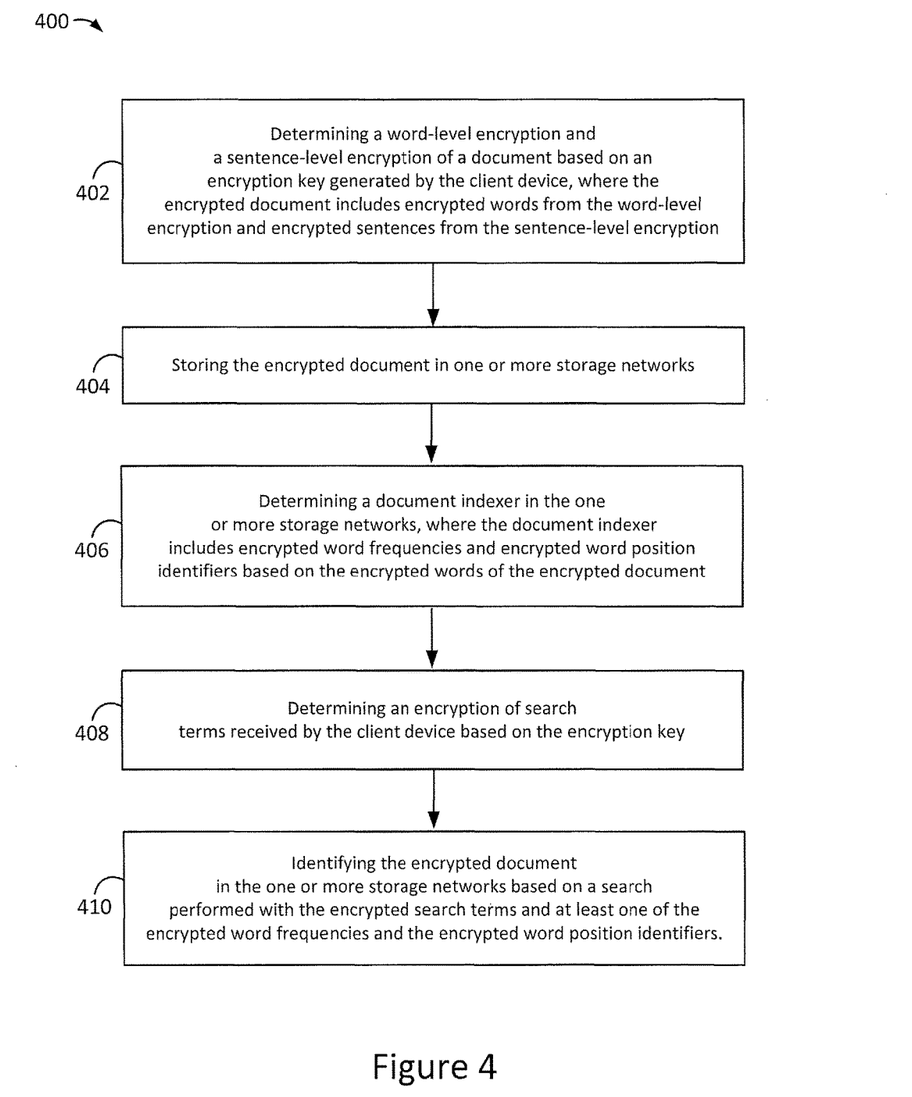
FIG. 4 is a flowchart associated with encrypting documents.

FIG. 4 is a flowchart of a method 400 associated with encrypting documents. For example, the steps 402-410 may be performed by a client device, such as the client device 106 described above in relation to FIGS. 1A-1B.

At step 402, the method 400 includes determining a word-level encryption and a sentence-level encryption of a document based on an encryption key generated by a client device, where the encrypted document includes encrypted words from the word-level encryption and encrypted sentences from the sentence-level encryption. For example, the method 400 may include determining a word-level encryption and a sentence-level encryption from the STR encryption 304 of the one or more documents 302. Further, the STR encryption 304 may be based on an encryption key (e.g., the encryption keys 110 and/or 118) generated by a client device (e.g., the client device 106).

At step 404, the method 400 includes storing the encrypted document in one or more storage networks. For example, the method 400 may include storing the encrypted words 310 from the STR encryption 304 in the sentence dictionary 306 and/or the STR index database 318, possibly located in one or more storage networks. Further, the method 400 may include storing the encrypted path and filenames of the one or more documents 302 in the one or more storage networks. Yet further, the method 400 may include storing the inverted indices 311 and the calculated word frequencies (e.g., from the word frequency calculator 312) in the STR index database 318 located in the one or more storage networks. Referring back to FIGS. 1A and 1B, the one or more storage networks may include the one or more storage networks 102, 124, 126, and/or 128.

At step 406, the method 400 includes determining a document indexer in the one or more storage networks, where the document indexer includes encrypted word frequencies and encrypted word position identifiers based on the encrypted words of the encrypted document. For example, the method 400 may include determining or building the STR document indexer 314 in the one or more storage networks described above. The STR document indexer 314 may include the encrypted word frequencies calculated, described above as the "$E_Q$(WordFrequency)" in STR index database 318. The STR document indexer 314 may also include encrypted word position identifiers, described above as the "$E_Q$(PositionID)" in STR index database 318. The encrypted word frequencies and the encrypted word position identifiers may be based on the encrypted words 310.

At step 408, the method 400 includes determining an encryption of search terms received by the client device based on the encryption key. For example, the method 400 may include determining the STR encryption 220 of the search terms 218 received by the client device (e.g., the client device 106) based on the encryption key (e.g., the encryption keys 110 and/or 118.)

At step 410, the method 400 includes identifying the encrypted document in the one or more storage networks based on a search performed with the encrypted search terms and at least one of the encrypted word frequencies and the encrypted word position identifiers. For example, the method 400 may include identifying the encrypted document (e.g., the matched documents and/or locations 224) in the one or more storage networks 210 based on a search performed with the encrypted search terms 222. The encrypted document may be identified based on the encrypted word frequencies, described above as the $E_Q$(WordFrequency) in STR index database 318. Further, the encrypted document may be identified based on the encrypted word position identifiers, described above as the $E_Q$(PositionID) in STR index database 318.

The method 400 may include determining one or more permutations of the encrypted search terms 222 as described above based on the search terms 218 received by the client device (e.g., the client device 106.) Further, the method 400 may include identifying the encrypted document (e.g., the matched documents and/or locations 224) based further on the search performed with the one or more permutations of the encrypted search terms 222.

The method 400 may include determining a sub key 118 generated by the client device 106 that is different than the encryption key, where the encrypted word frequencies, $E_Q$(WordFrequency), and the encrypted word position identifiers, $E_Q$(PositionID), may be determined based on the sub key 118.

The method 400 may include determining a second encryption (e.g., a double encryption) of the encrypted search words 222. The method 400 may include sending the second encrypted search words to a provider of the one or more storage networks (e.g., the storage networks 102, 124, 126, and/or 128). The method 400 may include identifying the encrypted document of the matched documents and/or locations 224 based on a decryption (e.g., the STR decryption 226) of the second encrypted search words to the encrypted search words 222.

The system 100, possibly also referred to as the client system 100, may include a non-transitory computer-readable medium including instructions. Further, one or more processors of the client device 106 may be configured to execute the instructions to perform operations. As noted, the operations include determining an encryption (e.g., a word-level encryption, a sentence-level encryption, and/or a paragraph-level encryption) from the STR encryption 304 of the one or more documents 302. The operations may also include storing the encrypted words from the STR encryption 304 in the sentence dictionary 306 located in one or more storage networks.

Further, the operations include determining an STR document indexer 314 in the one or more storage networks (e.g., the storage networks 102, 124, 126, and/or 128), as noted above. Yet further, the operations may include determining the STR encryption 220 of the search terms 218 received by the client device (e.g., the client device 106) based on the encryption key (e.g., the encryption keys 110 and/or 118.) In addition, the operations may include identifying the encrypted document (e.g., the matched documents and/or locations 224) in the one or more storage networks 210 based on a search performed with the encrypted search terms 222.

The client system 100 may perform operations including determining one or more permutations of the encrypted search terms 222 based on the search terms 218 received by the client device (e.g., the client device 106.) Further, the operations may include identifying the encrypted document (e.g., the matched documents and/or locations 224) based further on the search performed with the one or more permutations of the encrypted search terms 222.

The client system 100 may perform operations including determining a sub key 118 generated by the client device 106 that is different than the encryption key. Further, the encrypted word frequencies, $E_Q$(WordFrequency), and the encrypted word position identifiers, $E_Q$(PositionID), may be determined based on the sub key 118.

The client system 100 may perform operations including determining a second encryption (e.g., a double encryption) of the encrypted search words 222. The operations may also include sending the second encrypted search words to a provider of the one or more storage networks (e.g., the storage networks 102, 124, 126, and/or 128). Further, the client device 100 may identify the encrypted document of the matched documents and/or locations 224 based on a decryption (e.g., the STR decryption 226) of the second encrypted search words to the encrypted search words 222.

Figure 5:
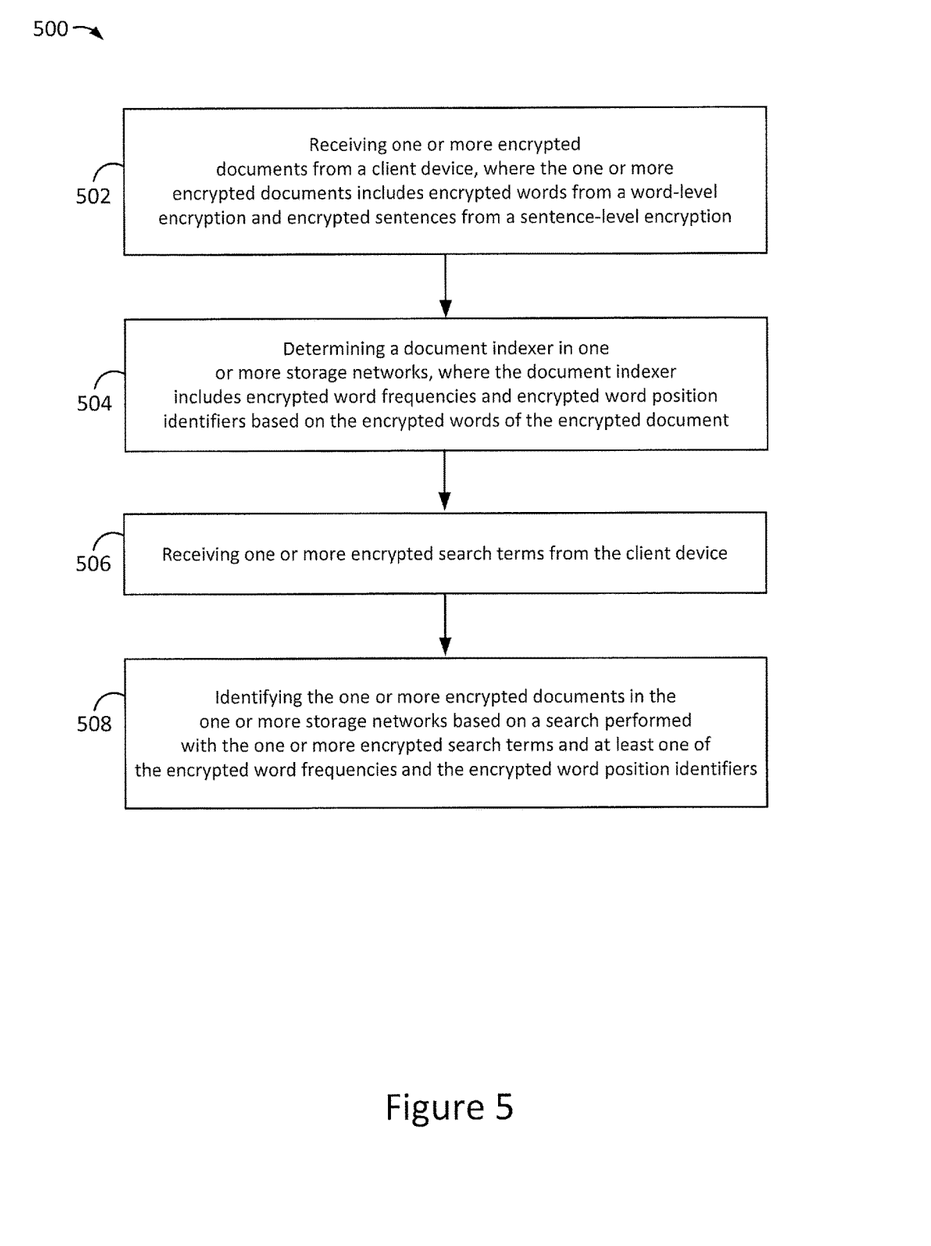
FIG. 5 is a flowchart associated with encrypting documents.

FIG. 5 is a flowchart of a method 500 associated with encrypting documents. For example, the steps 502-508 may be performed by a server, such as the server 104 described above in relation to FIGS. 1A-1B.

At step 502, the method 500 includes receiving one or more encrypted documents from a client device, where the one or more encrypted documents includes encrypted words from a word-level encryption and encrypted sentences from a sentence-level encryption. For example, the method 500 may include receiving one or more encrypted documents 114 and/or 122 from the client device 106. The one or more encrypted documents 114 and/or 122 may include encrypted words from a word-level encryption and encrypted sentences from a sentence-level encryption from the STR encryption 304 of the one or more documents 302.

At step 504, the method 500 includes determining a document indexer in one or more storage networks, where the document indexer includes encrypted word frequencies and encrypted word position identifiers based on the encrypted words of the encrypted document. For example, the method 400 may include determining or building the STR document indexer 314 in the one or more storage networks (e.g., the storage networks 102, 124, 126, and/or 128).

At step 506, the method 500 includes receiving one or more encrypted search terms from the client device. For example, the method 500 may include receiving one or more encrypted search terms 222 from the client device 106.

At step 508, the method 500 includes identifying the one or more encrypted documents in the one or more storage networks based on a search performed with the one or more encrypted search terms and at least one of the encrypted word frequencies and the encrypted word position identifiers. For example, the method 500 includes identifying the one or more encrypted documents (e.g., matched documents and/or locations 224) in the one or more storage networks 210, possibly based on the STR search 220 performed with the one or more encrypted search terms 222. The one or more encrypted documents may also be identified based on the encrypted word frequencies, described above as the $E_Q$(WordFrequency) in STR index database 318 and/or the encrypted word position identifiers, described above as the $E_Q$(PositionID) in STR index database 318.

The server 104 may store the STR document indexer 314 and/or the STR index database 318 in one or more memories of the server 104. Further, a sub key (e.g., the encryption key 118) may be generated by the client device (e.g., the client device 106). In one example, the encrypted word frequencies, described above as $E_Q$(WordFrequency), and the encrypted word position identifiers, described above as $E_Q$(PositionID), may be encrypted based on the sub key 118.

Referring back to FIG. 2A, the one or more encrypted search terms may include double encrypted search terms, possibly encrypted a number of times by the client device 106. The method 500 may include determining the single encrypted search terms 222 based on a decryption of the double encrypted search terms with the sub key 118 generated by the client device 106. Thus, the one or more encrypted documents (e.g., the matched documents 224) may be identified based further on the search 222 performed with the single encrypted search terms 222.

The method 500 may include determining one or more permutations of the encrypted search terms 222. As such, the one or more encrypted documents (e.g., the matched documents 224) may be identified based further on the search 222 performed with the one or more permutations of the encrypted search terms 222.

Notably, any one or more of the steps 502-508 of the method 500 may be combined with any one or more of the steps 402-410. In particular, a client device (e.g., the client device 106) may perform the word-level encryption and the sentence-level encryption based on the encryption key generated by the client device (e.g., the step 402), thereby storing the encrypted documents with the server (e.g., the server 104). Yet, the server may build the STR document indexer and/or the STR index database 318 (e.g., the step 504). As such, the server may receive the one or more encrypted search terms from the client device (e.g., the step 506) and identify the one or more encrypted documents (e.g., the step 508).

The client system 100 described herein may include a non-transitory computer-readable medium including instructions. The client system 100 may include one or more processors of the client device 106 configured to execute the instructions. The client system may include means for determining an encryption of one or more documents based on one or more encryption keys 110 and/or 118. The client system 100 may include means for determining a document indexer 314 in one or more storage networks 102, 124, 126, and/or 128, where the document indexer 314 includes encrypted word frequencies, $E_Q$(WordFrequency), and encrypted word position identifiers, $E_Q$(PositionID), based on the encrypted words 310 of the one or more documents 302 encrypted with the one or more encryption keys 110 and/or 118. The client system 100 may include means for determining an encryption 204 of one or more search terms 218 received by a user interface of the client system 100 (e.g., the client device 106) based on the encryption key 110 and/or 118. The client system 100 may include means for identifying the one or more encrypted documents 224 in the one or more storage networks 102, 124, 126, and/or 128 based on a search performed with the one or more encrypted search terms 224 and at least one of the encrypted word frequencies, $E_Q$(WordFrequency), and the encrypted word position identifiers, $E_Q$(PositionID).

We claim:

1. A method comprising:
    (a) obtaining one or more first documents by a system comprising a non-transitory computer readable medium with instructions, and comprising one or more processors executing the instructions, wherein each first document comprises one or more first sentences each of which comprises one or more first words, and at least one first document comprises a plurality of first sentences at least one of which comprises a plurality of first words;
    (b) determining dictionary data by the system, wherein determining the dictionary data comprises determining by the system, using each first document, a word-level encryption and a sentence-level encryption based on an encryption key generated by the system, wherein:
    determining the sentence-level encryption comprises determining a plurality of encrypted sentences each of which is an encryption of a corresponding one of the first sentences, each first sentence corresponding to an encrypted sentence; and
    determining the word-level encryption comprises determining a plurality of encrypted words each of which is an encryption of a corresponding one of the first words, each first word corresponding to an encrypted word;
    wherein the dictionary data comprises the encrypted words and the encrypted sentences;
    (c) storing the dictionary data in one or more storage networks;
    (d) determining index data by the system, and storing the index data in the one or more storage networks, wherein the index data comprises encrypted word frequencies and encrypted word position identifiers based on the encrypted words;
    (e) determining, by the system, an encryption of search terms received by the system based on the encryption key; and
    (f) identifying, by the system, one or more of the first documents in the one or more storage networks based on a search performed with the encrypted search terms and at least one of the encrypted word frequencies and the encrypted word position identifiers.

2. The method of claim 1, wherein the encryption key is secured with the system such that the encryption key is inaccessible by external devices.

3. The method of claim 1, further comprising determining one or more permutations of the encrypted search terms based on the search terms received by the system, and wherein identifying one or more of the first documents is based further on the search performed with the one or more permutations of the encrypted search terms.

4. The method of claim 1, wherein the method further comprises determining a sub key generated by the system that is different than the encryption key, wherein the encrypted word frequencies and the encrypted word position identifiers are determined based on the sub key.

5. The method of claim 1, the method further comprising:
    determining a second encryption of the encrypted search words; and sending the second encrypted search words to a provider of the one or more storage networks, wherein identifying one or more of the first documents is based on a decryption of the second encrypted search words to the encrypted search words.

6. The method of claim 1, wherein the index data further comprises a word identifier, a document identifier of a first document, and a sentence identifier corresponding to the first document.

7. The method of claim 1 wherein each word position identifier identifies a word position in a first sentence.

8. A system comprising:
a non-transitory computer-readable medium comprising instructions;
one or more processors configured to execute the instructions to cause the system to perform operations comprising:
(a) obtaining one or more first documents, wherein each first document comprises one or more first word sets each of which comprises one or more first words, and at least one first document comprises a plurality of first word sets at least one of which comprises a plurality of first words;
(b) determining dictionary data, wherein determining the dictionary data comprises determining, using each first document, a word-level encryption and a set-level encryption based on one or more encryption keys, wherein:
determining the set-level encryption comprises determining a plurality of encrypted word sets each of which is an encryption of a corresponding one of the first word sets, each first word set corresponding to an encrypted word set; and
determining the word-level encryption comprises determining a plurality of encrypted words each of which is an encryption of a corresponding one of the first words, each first word corresponding to an encrypted word;
wherein the dictionary data comprises the encrypted words and the encrypted word sets;
determining index data in one or more storage networks, wherein the index data comprises encrypted word frequencies and encrypted word position identifiers based on the encrypted words;
determining an encryption of one or more search terms received by a user interface of the system based on the one or more encryption keys; and
identifying one or more of the first documents in the one or more storage networks based on a search performed with the one or more encrypted search terms and at least one of the encrypted word frequencies and the encrypted word position identifiers.

9. The system of claim 8, wherein the one or more encryption keys are secured with the system such that the one or more encryption keys are inaccessible by external devices.

10. The system of claim 8, wherein the one or more processors are configured to execute the instructions to cause the system to perform further operations comprising:
determining one or more permutations of the one or more encrypted search terms based on the one or more search terms received, and wherein identifying one or more of the first documents is based further on the search performed with the one or more permutations of the encrypted search terms.

11. The system of claim 8, wherein each first word set is a sentence or a paragraph.

12. The system of claim 8, wherein the one or more processors are configured to execute the instructions to cause the system to perform further operations comprising:
determining a sub key generated by the system that is different than the one or more encryption keys, wherein the encrypted word frequencies and the encrypted word position identifiers are determined based on the sub key.

13. The system of claim 8, wherein the one or more processors are configured to execute the instructions to cause the system to perform further operations comprising:
determining a second encryption of the one or more encrypted search words; and
sending the second encrypted search words to a provider of the one or more storage networks, wherein identifying the encrypted document is based on a decryption of the second encrypted search words to the one or more encrypted search words.

14. The system of claim 8 wherein each word position identifier identifies a word position in a first word set.

15. A method of a server, comprising:
receiving one or more encrypted first documents from a client device, each encrypted first document being an encryption of a corresponding first document, wherein each of the one or more encrypted first documents comprises dictionary data comprising a word-level encryption of each first document, the word-level encryption comprising encrypted words, the dictionary data also comprising a sentence-level encryption of each first document, the sentence-level encryption comprising encrypted sentences, wherein at least one encrypted sentence is a sentence-level encryption of a first sentence comprising a plurality of first words, and the encrypted words comprise a word-level encryption of each first word;
wherein each first document comprises one or more first sentences each of which comprises one or more first words, and at least one first document comprises a plurality of first sentences at least one of which comprises a plurality of first words;
wherein the sentence-level encryption comprises a plurality of encrypted sentences each of which is an encryption of a corresponding one of the first sentences, each first sentence corresponding to an encrypted sentence; and
the word-level encryption comprises a plurality of encrypted words each of which is an encryption of a corresponding one of the first words, each first word corresponding to an encrypted word;
determining index data in one or more storage networks, wherein the index data comprises encrypted word frequencies and encrypted word position identifiers based on the encrypted words of the encrypted documents;
receiving one or more encrypted search terms from the client device;
identifying one or more of the encrypted documents in the one or more storage networks based on a search performed with the one or more encrypted search terms and at least one of the encrypted word frequencies and the encrypted word position identifiers.

16. The method of claim 15, wherein the server comprises a sub key generated by the client device, and wherein the encrypted word frequencies and the encrypted word position identifiers are encrypted based on the sub key.

17. The method of claim 15, wherein the one or more encrypted search terms comprises second encrypted search terms, wherein the method further comprises determining single encrypted search terms based on a decryption of the second encrypted search terms with a sub key generated by the client device, and wherein identifying one or more of the encrypted documents is based further on the search performed with the single encrypted search terms.

18. The method of claim 15, further comprising determining one or more permutations of the encrypted search terms, and wherein identifying the one or more encrypted documents is based further on the search performed with the one or more permutations of the encrypted search terms.

19. The method of claim 15, wherein the index data further comprises a plurality of word identifiers, a plurality of document identifiers, and a plurality of sentence identifiers corresponding to the one or more encrypted documents.

20. The method of claim 15 wherein each word position identifier identifies a word position in a first sentence.

\* \* \* \* \*